Sept. 19, 1972   B. CARLSSON ET AL   3,692,612
SYSTEM FOR MANUFACTURING PARTICLE BOARD OR THE LIKE
Filed Dec. 18, 1968   2 Sheets-Sheet 2

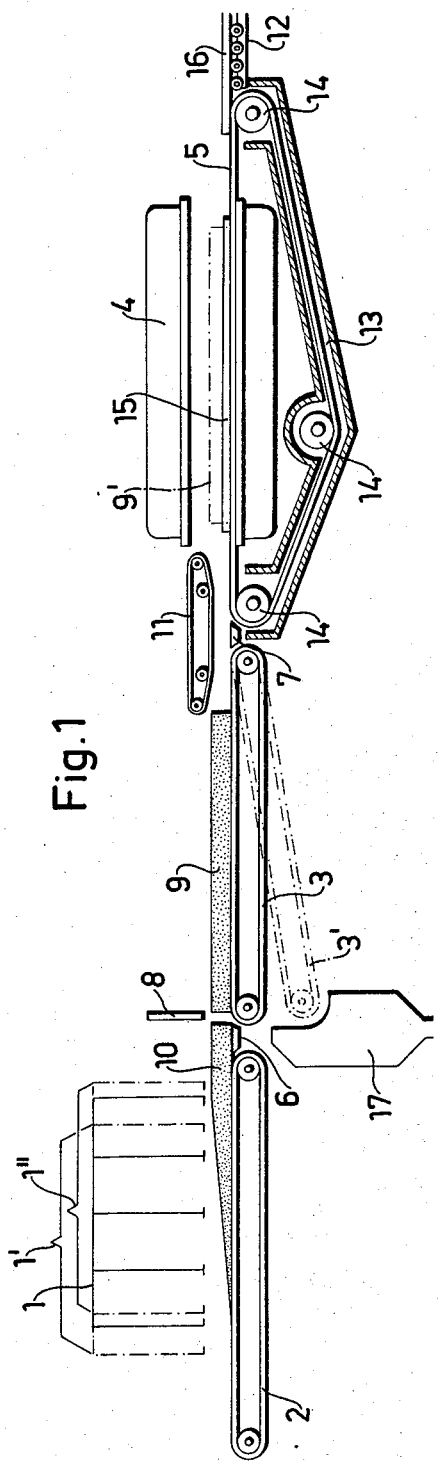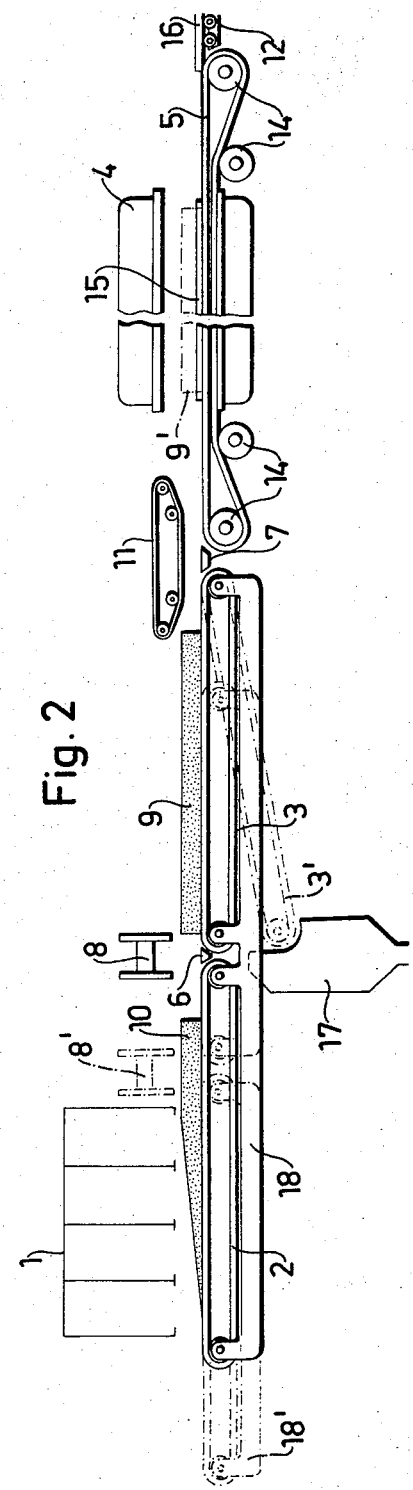

3,692,612
SYSTEM FOR MANUFACTURING PARTICLE
BOARD OR THE LIKE
Bengt Carlsson and Mauritz R. G. Sundberg, Motala, Sweden, assignors to Aktiebolaget Motala Verkstad, Motala, Sweden
Filed Dec. 18, 1968, Ser. No. 784,843
Claims priority, application Sweden, Dec. 22, 1967, 17,732/67; Dec. 6, 1968, 16,742/68
Int. Cl. B32b 5/16; B29j 5/08
U.S. Cl. 425—305
2 Claims

ABSTRACT OF THE DISCLOSURE

There is disclosed a machine for manufacturing particle board according to which wood chips are spread on a conveyor belt, referred to as a spreader belt, forming a slab which is cut into sections of predetermined length by a saw positioned between said spreader belt and a belt referred to as a transfer belt which conveys the individual sections to a third belt which is referred to as a presser belt where the sections are compressed by a press, and the machine includes a fourth conveyor belt positioned between the transfer belt and the presser belt at the input end of the presser belt for exerting comparatively light pressure against the top surface of each section as it passes to the press.

---

Figure 3:
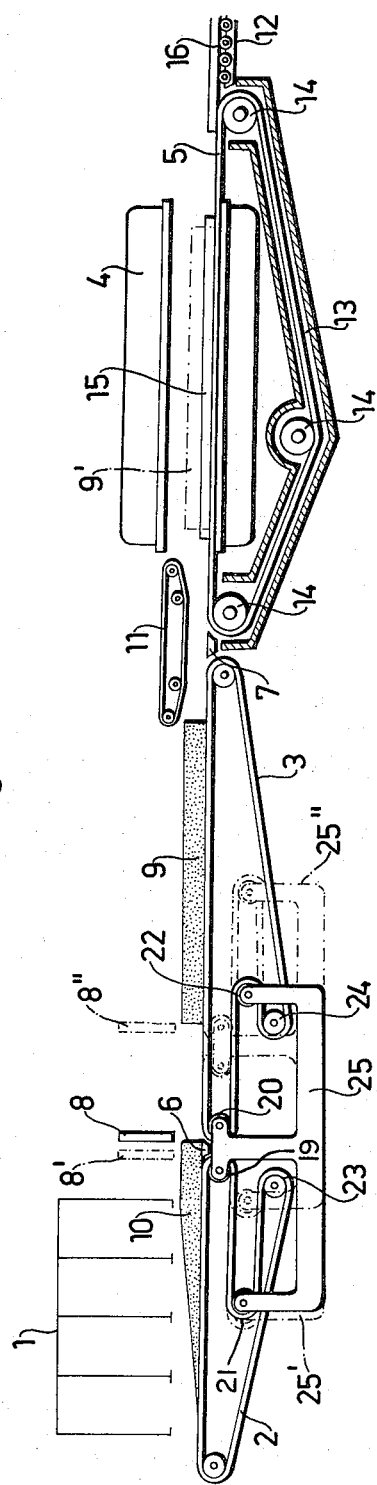

Particle board is normally manufactured by first producing a continuous web of wood chips, shavings or the like, by spreading from one or more machines adhesive coated wood chips as evenly as possible over a planar support surface which is often in the form of an endless conveyor belt. The lengthwise continuously increasing particle or chip web is then divided into lengths, called in the following particle slabs, which are charged to a hot press. The particle slabs are compressed to the desired thickness in the press, and heated so that the particles become bonded together and a rigid and strong particle board is obtained. Previously presses composed of several storeys, so-called multi-storey presses were almost exclusively used for pressing the particle slab, and into which the particle slabs were usually introduced batch-wise, placed on special conveyor plates, although manufacturers have now begun to use very wide and long single-storey presses into which the particle slabs are introduced one at a time, resting on an endless conveyor belt, in the following called the press belt, and drawn through the press opening. The pressed particle board is also removed from the press by means of the press belt. The press belt must be able to resist the heat in the press, and hitherto steel belts have been used which, because of their width, have been made from 1 to 1.5 mm. thick and have been all-welded so that no joints are present in the belt which are liable to mark the particle board.

Systems in single storey presses of the aforementioned type are known, in which the press belt is extended so far in front of the press that the particulate material can be sprayed direct onto said belt, both whilst it is stationary during the pressing operation, the spreading machine moving slowly rearwardly away from the press, and whilst the press is being charged, the press belt and the spreading machine moving rapidly forwards at the same relative speed differential as the previous rearward travel speed of the spreading machine whilst the press belt was stationary, to maintain a continuous spreading of the particulate material on the belt. With the view of obtaining the highest production capacity a short press charging time is sought after, which means that the speed at which the press belt moves, and thereby also the speed at which the chip spreading machine moves forward during the press charging operation, becomes high and the changes in speed of both the press belt and the chip spreading machine become wide at the beginning and end of the press charging process.

Because of the relatively high speeds of movement and wide changes in speed of the system components, large power-demanding machinery is required to operate the system, the chip spreading machine in particular having a considerable mass. The weight of this machine may rise to 25 tons or more. The length of travel of the chip spreading machine is almost equal to the length of the press, which may reach 15 meters for example, since the length of the web to be strewn onto the press belt during rearward and forward movement of the chip spreading machine corresponds to the length of the press, and the time taken during forward movement of the chip spreading machine is very short compared with the time taken for the backward movement of said machine. The large distance moved by the chip spreading machine causes complications in the supply of chips thereto; where in fact the flow of chips should be as uniform as possible. The press belt is also long as a result thereof, and expensive to produce and difficult to handle during repair work, and hence high requirements are placed on repair equipment to prevent damage to the belt from causing serious interruptions in operation.

The wide changes in speed at the beginning and end of a press charging operation also cause the chips ejected from the chip spreading machine to be displaced at their point of impact on the belt, so that as a result the web is thicker at some places on the belt than at others, which subsequent to the pressing operation results in a particle board of varying physical properties. To prevent prehardening of the particle slab, which stands in readiness outside the press whilst the preceding cake is pressed, it is necessary to arrange that the particle slabs are spaced a sufficiently long distance apart, e.g. 300 mm. This can only be done by separating the particle web, by means of a saw for instance, using two cuts, whereafter the material between the cuts is removed and returned to the chip bin or spreading machine. Naturally, the press belt must be cooled before the particle web is formed thereon, to prevent prehardening of the undersurface of the particle web.

It is also known, e.g. from the Swedish patent specification 211,312, to strew the chips from a stationary chip spreading machine onto an endless conveyor belt, in the following called the spreader belt, which is remote from the press belt and the frame of which is movably arranged so that the spreader belt can be moved forwards and backwards beneath the chip spreading machine and above a portion of the press belt projecting outside the press or above a third endless conveyor belt arranged between the spreader machine and the press, the third belt being called in the following the transfer belt. During backward movement of the frame of the spreader belt the particle slab is moved from the spreader belt onto the press belt or the transfer belt, said slab being transferred from the latter belt to the press belt when charging the press. Thus, in this instance the movement of travel of the chip spreading machine has been replaced by a travel movement of the very much lighter spreader belt frame, thereby reducing power requirements and providing a particle web which does not present the differential thicknesses, caused by the variations in speed of the chip spreading machine. The press belt is also very much shorter in this instance. When a transfer belt is used, the press belt need only extend through the actual press and the time taken to charge the press is therefore equally as short as in the previously described system.

However, since the press is large, the all-welded press belt is also large and difficult to handle even in this instance, and the work required to change a damaged belt is almost as expensive as with the aforementioned very long press belts. In systems which do not include a transfer belt, the press belt must be about twice as long and the time taken to charge the press increase with the time taken to place the particle web onto the press belt. In the two latter cases, however, only one single saw-cut is required to separate the particle slabs from the particle web; on the other hand, however, it is necessary that the saw follows the particle web in its longitudinal movement, which complicates matters somewhat. A greater disadvantage, however, is that when transferring the particle slab from the horizontal spreader belt to the horizontal press belt extending beneath the spreader belt, or the transfer belt, the particle slab is subjected to bending forces, first in one direction and then in the other, whereupon cracks are liable to form in the surface of the particle slab and the smallest chips in the lower portions of said slab are liable to heap together, all resulting in an unfavourable effect on the quality of the finished particle board.

It should not be necessary in a system of the last mentioned type to cool the press belt before the particle slab is transferred to said belt, at least not if the system is provided with a transfer belt, since any heating of the particle slab from the press belt is unable to affect said slab to any appreciable extent during the short time it takes to charge the press. However, owing to the large surface of the belt in relation to its mass the portion of said belt located outside the press cools very rapidly. The belt is also cooled by the large rollers which guide and drives the same. In known systems a completely cooled, or in all events a relatively cooled, press belt is passed together with the particle slab into the press when said press is charged. This impairs the supply of heat to the underneath of the particle slab during the pressing operation, so that firstly the pressing time increases and production capacity becomes lower and secondly the heat treatment of the particle slab is asymmetrical. When the press belt is reheated in the press it endeavours to expand, but the large frictional forces in the surfaces thereof counteract the increase in length and breadth of the press belt. In this way large pressure forces are built up in the press belt, which becomes deformed and buckles as a result thereof unless either the temperature of the press is restricted to a certain permissible upper limit or the pressure of the press is repeatedly reduced during heating of the belt so that said belt is able to expand. The necessary press time decreases, however, with increasing temperature and a restriction in the temperature of the press consequently means a restriction in production capacity. Unloading of the pressure of the press involves a deviation from the desired pressure-time sequence during the pressing operation and also causes a prolongation of the press time and a reduction of the production capacity. Both of these methods consequently cause considerable disadvantages.

The object of the present invention is to completely eliminate or substantially reduce the aforementioned disadvantage in known systems employed with single storey heat presses for the manufacture of particle board or the like. This object is achieved by means of the present invention which is characterized by the features of the accompanying claims.

Figure 4:
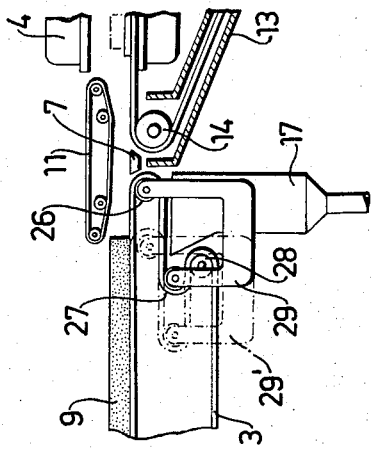

The invention will now be described with reference to the accompanying drawings, further characterizing features of the invention being disclosed in conjunction therewith. In the drawing, FIG. 1 shows diagrammatically in side elevation a system according to the invention for forming and pressing particle board, FIG. 2 shows an alternative system, also diagrammatically and in side view, FIG. 3 shows diagrammatically and in side elevation another embodiment of a particle board production system, and FIG. 4 shows diagrammatically a suitable embodiment of one element in the system of FIG. 3.

FIG. 1 shows a chip spreading machine 1 having arranged there beneath a spreader belt 2, a transfer belt 3 and a single-storey hot press 4 provided with an associating press belt 5. The chip spreading machine 1 operates continuously and is arranged in a manner known per se to travel in the longitudinal direction of the system, while the spreader belt 2, the transfer belt 3 and the press 4, together with press belt 5 are stationarily arranged. Between the spreader belt 2 and the transfer belt 3 there is provided a stationary slide plate 6 and between the transfer belt 3 and the press belt 5 is a similar slide plate 7. The conveyor belt 2, 3 and 5 and the slide plates 6 and 7 are so arranged that their upper surfaces lie within practical limits in one and the same plane which is approximately horizontal.

At the bridge between the slide plate 6 and the transfer belt 3 is positioned a cross cut saw 8 adapted to divide particle slabs 9 into lengths, adapted to the size of the press, from the continuously formed, integrated particle web 10. Located above the slide plate 7 and the ends of the transfer belt 3 and the press belt 5 facing said plate 7 is a fourth, endless conveyor belt 11, the carrier belt, which assists in moving the particle slab 9 over the slide plate 7 when charging the press, as will be described in more detail below. At the other end of the press belt 5 is a roller belt 12 or some other suitable form of conveyor means, for removing the pressed particle boards.

To provide for and control the movements of the chips spreading machine 1 and the various conveyor belts 2, 3, 5 and 11 and the cross cut saw 8 there is provided operating and control means of known species, which for the sake of clarity have not been shown in the figure. For the same reason only the two press platens with associating press plates have been shown of the actual press 4. The travel of the chip spreading machine 1 is controlled in a known manner from the movement of the spreader belt 2, so that a constant speed differential, the web forming speed, is maintained between the belt speed of spreader belt 2 and the speed of travel of the chip spreading machine 1, independent of how the spreader belt moves. The forming speed is set so that one length of chips equal to the length of the particle slab 9 is formed during the time taken to complete one working cycle of the press.

The press belt 5 is suitably made of steel and, in accordance with Swedish patent (patent appln. 14,346/67), is arranged so that the section of the belt which, when charging the press accepts the particle cake 9 and moves it into the press 4 is imparted a suitable temperature prior thereto, preferably about the same temperature as that of the hot plates of the press. In the exemplary embodiment the lower part of the press belt 5 is drawn beneath the press 4 through a heat insulated passage 13, which prevents the belt from growing cold and which may be provided with heating means (not shown). The rollers 14 which operate and control the press belt 5 may also suitably be heated, so that the belt is not cooled, but instead is heated from the rollers. The press belt 5 and the transfer belt 3 may also be arranged to be operated during press charging operations in the manner described in Swedish patent (patent appln. 13,805/67), so that certain specific sections of the press belt constantly participate in the pressing operation, whereby the press belt need not be fully welded, but may be composed of several parts riveted together or may be jointed together by rivets etc.

The figure shows in full lines the system at that moment when the press has just been opened and charging of the press shall commence. Located in the press opening is the last pressed particle board 15, resting on the press belt 5 which still remains stationary in the position it occupied during the pressing operation. The particle board 16 pressed in the preceding pressing operation may still remain in the press opening, partly on the discharge end of the press belt 5 and partly on the roller path 12, unless it has been specially removed for further treatment. The remaining conveyor belt 2, 3 and 11 are also stationary, while, on the other hand, the chip spreading machine 1 moves backwards, away from the press, at the web forming speed. On the stationary transfer belt 3 is a particle slab 9 which has been separated from the particle web 10 and which is to be charged to the press 4.

As soon as the press 4 has been opened sufficiently— it need not be fully open—the press belt 5 is started and begins to move out the pressed particle board 15 from the press opening. At the same time, immediately afterwards, the transfer belt 3 and the carrier belt 11 are started and then operated at the same belt speed as the press belt 5, whereupon the particle slab 9 is fed over onto a section of the press belt 5, which prior to this has been heated to a suitable temperature, and is moved further by said belt into the now fully opened press 4, to the position 9, marked by morse lines. When the particle slab 9 has reached this position, the press belt 5 is stopped, whereafter the press is closed and pressing commences. The pressed particle board 15 has then been moved to the position 16 and can be removed therefrom onto the roller path 12.

During the press charging operation the three conveyor belts 3, 5 and 11 are operated at the maximum speed which the loose particle slab 9 can withstand without being damaged by occurring acceleration forces and air streams to maintain the time taken to charge the press at a minimum. The transfer belt 3 and the carrier belt 11 are then stopped simultaneously with the press belt 5, whereafter they can be operated independently of said belt 5. The transfer belt 3 can, furthermore, be stopped to then be operated independently of the press belt 5, as soon as the rear end of the particle slab 9 has passed the transfer belt 3, i.e. before the press charging operation has been fully terminated.

The carrier belt 11 is so arranged that during the press charging operation it lies against the upper surface of the particle cake 9, exerting a light pressure thereon. The purpose of the carrier belt 11 is to assist in conveying the particle slab 9, and particularly the rear portion thereof, over the slide plate 7. The tensile strength of the particle slab 9 is actually so low that it is not possible to pass its rear portion over the slide plate by means of the press belt 5 without the assistance of a sufficiently large pushing force, since otherwise the particle slab tends to crumble before its rear end has left the transfer belt 3. However, with the assistance of the carrier belt 11 it is possible to guide the particle slab 9 over the slide plate 7 without risk of the slab crumbling. The slide plate 7 should be flat and polished, so that the friction between slide plate and particle slab is as small as possible, while, on the other hand, the carrier belt 11 should be constructed to create high frictional forces against the particle slab, e.g. by providing said belt with narrow transversely extending grooves. To prevent the carrier belt 11 from damaging the top surface of the particle slab 9 it should be provided with direction changing rollers, as shown in the figure, so that the bottom portion of said belt is directed slightly upwardly at the two ends thereof and the pressure from the belt is successively exerted against and removed from the particle slab. The carrier belt 11 is adapted for vertical adjustment, so that its distance from the slide plate 7 can be adapted to the thickness of the particle slab 9.

As soon as the transfer belt 3 has been stopped, the drive of said belt is connected to the drive of the then stationary spreader belt 2, whereafter the two belts are started and driven at the same belt speed, to commence feeding the particle web 10 over onto the transfer belt 3. The belt speed is higher than the web forming speed so that the chip spreading machine 1, which has now reached the rear position 1' shown in morse lines, changes its direction of travel at the same time, and begins to move forwards towards the press.

When the chip spreading machine 1 reaches during its forward movement a fixed forward position, also shown in morse lines in the figure and identified by the reference numeral 1', the belt speed of the two conveyor belts 2 and 3 is reduced to the web forming speed, whereupon the chip spreading machine stops in the position 1'. Subsequent to a suitable length of the particle web 10 being transferred to the transfer belt 3 to form a new particle slab 9, the spreader belt 2 and the transfer belt 3 are stopped and the drives of said belt disconnected. The chip spreading machine once again commences its rearward travel at the web forming speed, while at the same time the cross cut saw 8 is started and separates the new particle slab 9 from the particle web 10. The stage has now been reached when the pressing operation commences, and the press begins to open at approximately the same time as or immediately the same time as or immediately after the particle slab 9 is separated from the web by the saw 8, and the whole system is thus now back to the starting position shown by the full lines in the figure.

For the sake of clarity the particle slab 9 has been shown separated from the particle web by a relatively wide gap, although the slab can be separated from the web by a single cut, made transversely across the particle web.

No arrangement corresponding to the carrier belt 11 is required at the slide plate 6 to transfer the particle web 10 undamaged over the slide plate since the rearward portion of the particle web on the spreader belt is constantly pushed onto the belt.

In the described system, the particle web 10 is transferred from the spreader belt 2 to the transfer belt 3 and the particle slab 9 is transferred from the transfer belt 3 to the press belt 5 without said web or slab being subjected to any bending forces liable to cause cracks to form therein or chips to agglomerate or heat thereon. The particle slab 9 is separated from the particle web 10 by a single saw cut from a stationarily positioned cross cut saw, and only a very insignificant amount of adhesive coated chips need thus be returned from the sawing station. The length of travel of the chip spreading machine 1 may also be made much shorter than in known systems provided with travelling chip spreading machines. Thus, the chip spreading machine need only travel rearwardly at the low web forming speed for the short period of time taken to separate the particle slab 9 from the particle web 10 and to charge the press 4. Even in the case of very large presses these operations can be conducted in a time of about 20 seconds, which is only a fraction of the time taken to effect the full working cycle of the press.

The time taken to effect the pressing cycle becomes shorter with the decreasing thickness of the particle board to be pressed, although this time does not fall below 2 minutes even in the case of the finished particle board, which means that the chip spreading machine 1 is only required to move rearwardly for at most about ⅙ of the time taken to effect the pressing cycle and that the longest theoretically necessary travel need only be about ⅙ of the length of the particle slab 9. The forward speed of travel of the chip spreading machine can therefore also be selected low, e.g. equal to the highest web forming speed, without if being necessary to utilize more than a fraction, at the most about ⅓ of the time taken to effect the pressing cycle, for the travel movement, and the changes of travel movement can be effected with small accelerations and retardations, so that the irregularities formed in the particle web by said changes are negligible. However, there is still sufficient time, even in the shortest pressing cycle, to effect a length of travel which is approximately 3 times the length of that theoretically neccesary, and the chip spreading machine 1 is also adapted to be capable of carrying out a much longer length of travel than that theoretically required.

The press operates intermittently, and the time taken to effect a press cycle generally varies somewhat from one pressing sequence to the next, in addition to which the pressing cycle can on occasions take an abnormally long time. Contrariwise, forming of the web takes place continuously and at constant speeds, which can be adjusted, and it is desirable to avoid interruptions in the forming of the web, which would otherwise cause irregularities in the particle web. In known systems it is therefore usual to set the web forming speed to the longest normal time taken to effect a press cycle, so that in normal cases forming of the particle web can proceed uninterrupted while the press is idle for a short time prior to a press charging operation. In the case of abnormally long pressing times forming of the web must always be interrupted, until the press is clear. Since it is the capacity of the press which determines the capacity of the system it implies a drop in manufacturing capacity to allow the press to remain idle until forming of the web is completed. In the system here described this is avoided because the possible travel of the chip spreading machine 1 is greater than that theortically necessary. The forming speed is said to correspond to the average time taken for normal pressing cycles, and forming and pressing are synchronized so that a particle slab 9 is always present on the transfer belt 3 and ready to be charged to the press during a period of time which is, on average, somewhat greater than the difference between the average and the shortest time taken for normal pressing cycles. Naturally, the spreader belt 2 is stationary during the waiting period, and hence the rearward travel of the chip spreading machine is increased to correspond to the waiting time.

The travel possibilities of the chip spreading machine 1 may suitably be made so great that there is also permitted certain abnormal extensions of the press cycle without it being necessary to interrupt the forming of the web; the length of travel of the chip spreading machine, however, is a factor which must be decided in accordance with existing conditions. The greater length of travel of the chip spreading machine the greater the deviations which can be permitted in the synchronization of the web forming and pressing operations and the longer the abnormal press times which can be permitted without it being necessary to interrupt forming of the particle web and slabs. If the time taken to complete a press cycle is excessive forming of the particle web and slab is stopped automatically by a signal sent when the chips spreading machine 1 reaches a postion near to the rear limit of its length of travel. The web and slab forming operation is restarted as soon as the press has been charged. Because of the abnormally long press time the web and slab forming sequence, however, is so in advance of the pressing sequence that the particle slab 9 is ready and waiting much too in advance of the charging of the press and during this period the chip spreading machine 1 has travelled so far rearwardly that no reserve time is left for long press cycle periods. The desired synchronization of the system can be re-set by slightly reducing the continuously settable forming speed, until subsequent to a large number of normal press cycles the waiting period for the particle slab 9 has re-taken normal values. Synchronization is, of course, also adjusted correspondingly when it has deviated from the desired setting, perhaps because of a slightly wrong setting of the forming speed, so that either the press must sometimes wait to be charged or the particle slab 9 has to wait for an abnormally long period before being charged to the press.

The transfer belt 3 is arranged so that the portion of the particle web 10 resting thereon can be emptied when necessary by a manual signal into a bin 17 positioned beneath the rear end of the belt, e.g. if a fault is noticed in the particle web. The signal first stops the spreader belt 2 and the transfer belt 3 and divides the portion of the particle web 10 located on the transfer belt by means of the cross cut saw 8, whereafter the rear end on the transfer belt 3 is lowered to the position 3', shown in morse lines, and the belt is started in a reverse direction of movement and high belt speed, e.g. the same belt speed as that used to charge the press. Subsequent to emptying the material from the transfer belt 3 said belt immediately returns to its normal position 3', whereafter the chip spreading machine 1, the spreader belt 2 and the transfer belt 3 commences to operate in the same manner as that subsequent to a terminated press charging process, causing a new particle cake 9 to be placed on the transfer belt. During the sequence in which the transfer belt 3 is emptied of its load the chip spreading machine 1 removes rearwardly while the spreader belt 2 stands still. The emptying signal causes the transfer belt 3 to be emptied of its load even though a particle slab 9 has been separated from the particle web 10 and is ready for charging to the press, although said slab is blocked while charging of the press is underway. The emptying process is also used to feed away at the start of the system the first formed front end of the particle web, until it has obtained the correct thickness.

The waste material is returned from the bin 17 by means of conveyor means (not shown) to a suitable station in the particle board manufacturing chain. It is most usual to return the waste material to the so-called wet chips bin. The returned chips are coated with adhesive, which is destroyed in the subsequent chip drying sequence, whereafter the chips are recoated with adhesive in the adhesive coating machine. Since the cost of adhesive constitutes an appreciable part of the total costs of the finished chips supplied to the chip spreading machine 1 it is desired to return the least number of chips possible from the bin 17 and thus the transfer belt emptying process is only used when it is actually necessary, but stops the forming operation when the press is not able to operate quickly enough, and the irregularities in the particle web caused hereby are accepted. If, however, the chips from the bin 17 are returned behind the adhesive coating machine it is possible to empty the transfer belt 3 instead of stopping the particle web and slab forming process for excessively long press cycle times. In this instance, the emptying signal should be sent automatically, when the chip spreading machine 1 has reached a certain rear position, so selected that the emptying maneuver can be effected and the chip spreading machine is able to turn before it has reached the position at which the web forming sequence is stopped. The automatic emptying signal is also blocked while the press is being charged, since the chip spreading machine is able to turn after a completed press charging operation before it has reached the position in which the forming sequence is stopped if charging of the press has been commenced before the emptying signal is sent. In this instance, it is possible to use to advantage the manual emptying signal instead of adjusting the web forming speed, necessitating re-synchronization of the forming and pressing sequences after an abnormally long press cycle. The emptying impulse is released when a length of the particle web 10 has been fed to the transfer belt 3 which is approximately equal to the distance between the required and the normal rear turn position of the chip spreading machine 1, whereupon the system is re-synchronizated immediately.

The system shown in FIG. 2 comprises substantially the same components as those described above. Corresponding components have also been identified with the same reference numerals in the two figures. In the system shown in FIG. 2, however, the chip spreading machine 1 is stationary, while, on the other hand, the spreader belt 2, the transfer belt 3 and the slide plate 6 are arranged on a common frame 18, which is capable of travelling between a front position shown in full lines, nearest the press 4, in which the transfer belt 3 is located adjacent the slide plate 7 at the press belt 5 in the correct position for charging the press, and a rear position 18', shown in morse lines.

The cross cut saw 8 may also be arranged on the frame 18, and thus moves together with said frame between a front position, shown in full lines, and a rear position 8', shown in morse lines. The saw, however, may also be adapted to effect an essentially shorter length of travel on a travel path separate from the frame, as will be described in more detail below. The cross cut saw 8 is adapted to cut the particle web 10 with a double cut, one cut at the bridge position between the spreader belt 2 and the slide plate 6 and one cut at the bridge position between the slide plate 6 of the transfer belt 3, whereupon the portion of the particle web situated between the cuts is removed by suction in a known manner and returned to the chip spreader machine 1 or to some other suitable station in the chip manufacturing chain. The belt movement of spreader belt 2 is controlled independently of the travel of frame 18, so that the belt speed is always in constant relationship with the stationary chip spreading machine 1, which functions continuously. The belt speed, the web forming speed, is naturally adjustable so that the length of the press cycle can be adapted to different thicknesses of the particle board. The belt speed is adjusted so that a length of particle web, equal to the length of the particle slab 9 plus the length of the portion of particle web removed during the cutting operation, is formed during the average time taken to perform a normal pressing cycle.

Shown in FIG. 2 is an alternative arrangement of the press belt 5, adapted in accordance with Swedish patent (patent appln. 14,346/67) to impart to the section of the belt which upon the next press charging operation receives the particle slab 9 and moves it into the press at preferably approximately the same temperature as the hot plates of the press 4 but which in all events should not be more than 100° C. higher than the plate temperature. In this instance, the lower portion of the press belt 5 is also drawn back through the press opening. A section of this portion of the press belt 5 of equal length to the length of the press is thus heated during the pressing operation, and movement of the press belt 5 and transfer belt 3 when the press is charged is so adapted that the particle slab 9 is placed on this particular heated section of the belt.

FIG. 2 also shows in full lines the system at the moment when the press has just been opened and charging of the press is about to start. The last, pressed particle board 15 is still positioned in the press opening and the particle board 16 pressed in a preceding pressing operation may remain on the roller path 12. The travelling frame 18 is in its forward position and a particle slab 9 separated from the particle web 10 is positioned on the stationary transfer belt 3 ready to be charged to the press. The particle web 10 is formed on the spreader belt 2, which moves at a belt speed equal to the forming speed but relative to the stationary chip spreading machine 1 and the stationary frame 18, the forward end of said particle web 10 being advanced continuously in a direction towards the press 4. The forward end of the particle web 10, however, has not yet reached the front end of the spreader belt 2.

As soon as the press 4 has been opened sufficiently, it is charged in the manner described in the aforegoing with reference to FIG. 1, although in the embodiment now described the transfer belt 3 is not completely stopped when its drive, at the termination of a press charging operation, is disconnected from the drive of the press belt 4, but that the drive of said belt 3 is connected with the drive of the spreader belt 2 when the speed of said belt has been reduced to the web forming speed. The two conveyor belts 2 and 3 are then driven at the same absolute belt speed, equal to the web forming speed, independent of the travel of the frame 18, which is started as soon as the drives of the two conveyor belts are connected. The acceleration and retardation and the maximum rearward travel speed of the frame 18 can be arbitrarily selected, since they do not affect the movement of the particle web 10; and they can be chosen at rather high limits since the frame 18 with the conveyor belt positioned thereon etc. is a relatively light construction with essentially smaller mass than, for instance, the chip spreading machine 1, so that the power and dimensions of the machinery which drives the frame 18 are nevertheless quite moderate.

During the rearward travel of the frame 18 the front portion of the particle web 10 is passed to the transfer belt 3, while forming of the particle web 10 on the spreader belt 2 continues uninterrupted. Furthermore, subsequent to the frame 18 stopping at the rear position 18', indicated in morse lines in the figure, the particle web 10 continues to grow and is passed over onto the conveyor belt 3. The frame stands still in position 18' until the particle web on the transfer belt 3 has reached a length suitable to form a new particle slab 9. The forward travel of the frame 18 is then started, whereupon the frame is first imparted a speed equal to the forming speed so that the two conveyor belts 2 and 3 are stationary in relation to the frame 18 while the cross cut saw 8 cuts the particle web at the two opposing ends of the conveyor belt and the portion of the particle web positioned between the saw cuts is sucked away. Upon completion of the sawing operation the drive of the conveyor belt 3 is disconnected from the spreader belt 5, whereafter the frame 18 moves rapidly forward to its front position with the transfer belt 3 still remaining stationary in relation to the frame 18, while, contrariwise, the spreader belt 2 moves rearwardly in relation to the frame at a belt speed equal to the travel speed of the frame minus the forming speed. In this way the front portion of the upper part of the spreader belt 2 is exposed and space is obtained in which to receive the length of particle web which is then formed, while the frame 18 remains in the forward position whilst waiting for the press to be charged and during the press charging operation. Acceleration, maximum speed and retardation during the forward travel of the frame subsequent to the sawing operation can also be selected relatively high, but since the particle slab 9 accompanies the movement they must be selected so that the said slab 9 is not damaged by the mass forces and air currents which occur. It is hardly possible to use speeds and accelerations equally as large as those used in the rearward travel of the frame.

At the beginning of the next charging of the press the components of the system are thus back in the positions shown by the full lines in the figure. The leading edge of the particle web 10, however, may have adopted another position, depending on the time taken to complete a pressing cycle, i.e. the length of time the particle slab 9 has waited in the shown position. During this waiting time a new particle slab is formed continuously and the leading edge of the particle web 10 is advanced at the forming speed in a direction towards the press. In the event of abnormally long pressing cycles the leading edge may advance to such an extent that it passes over the slide plate 6 and onto the transfer belt 3 before the drive of said belt 3 has been connected with the drive of the spreader belt 2 subsequent to a terminated press charging operation and the transfer belt 3 can receive the particle web. Forming of the web is thus stopped automatically by a signal sent from a suitable transmitter if the leading edge of the particle web 10 advances too far in a direction towards the press 4 before the charging of the press has commenced, and is restarted automatically as soon as the press has been charged.

It will be evident from the aforegoing description of the functioning of the system that the saw 8, which is a relatively heavy unit, need not accompany the frame 18 during the whole of its travel, but only during the first portion of the forward movement of said frame, until sawing has been completed. It may therefore be convenient to movably arrange the saw on a separate path. The saw is connected with the frame when the two units are in their rear positions 8' and 18' respectively, so that both accompany each other when the frame begins its forward travel. As soon as the particle web 10 has been sawn the saw 8 is disconnected from the frame 18 and the saw returns to position 8' and waits there until the frame 18 has returned to position 18', when said saw is re-connected with the frame 18. Consequently, the saw never adopts the position 8, shown in full lines, but moves only a short distance from position 8' and at a maximum speed equal to the forming speed.

Similarly to the embodiment shown in FIG. 2 the portion of the particle web 10 positioned on the transfer belt 3 can be emptied by a manual signal, into a bin 17, e.g. when a fault is observed in the particle web. The signal causes the frame 18 to move forwards, whereupon the portion of the particle web 10 fed over the transfer belt 3 is separated in a normal manner from the portion which remains on the spreader belt 2. When the frame 18 reaches its forward position the rear end of the transfer belt 3 is lowered to position 3', shown by the morse lines, and the belt is moved rearwardly at the press charging speed, for instance, whereupon the particle web, the particle slab, positioned on the belt is emptied into the bin 17, from where it is then returned to a suitable station in the chip advancing chain. As soon as the transfer belt 3 has been emptied it returns to the normal position and is moved forwards at the forming speed, whereafter the system begins to function again in the manner subsequent to a normal press charging operation, i.e. the drives from the conveyor belts 2 and 3 are connected together, the frame 18 is moved back to its rear position 18' etc. The emptying signal can be released at any time whatsoever while the frame 18 is in its rear position, moving forwards or is stationary in its forward position waiting for the press to be charged, whereupon the part sequences of the emptying operation already effected are, of course, omitted, but the emptying signal is blocked during the press charging operation and suitably also during rearward movement of the frame. If considered suitable, the emptying operation may also be released automatically when the leading edge of the particle web 10 reaches a certain front position while a finished particle slab is waiting to be charged to the press, so that it is never necessary to stop the forming of the web.

As with the embodiment shown in FIG. 1 forming of the web and slabs should be synchronized with the pressing operation so that the frame 18 normally waits in its forward position for only a short period of time before the press is ready to receive the next charge. The synchronization of the system can be reset after and abnormally long pressing cycle either by making a small adjustment to the forming speed, whereupon synchronization is reset gradually during a large number of normal pressing cycles, or by emptying by means of the manual signal a suitable length of particle slab, whereupon the system is re-synchronized immediately.

The system of FIG. 2 affords the advantage over the system of FIG. 1 in that the travel of the heavy chip spreading machine 1 is replaced with the travel of the considerably lighter frame 18 with the conveyor belts 2 and 3 and slide plate 6 and possibly also the saw 8 positioned thereon. As previously mentioned, however, the saw 8 need only travel a small portion of the distance travelled by the frame 18 and its maximum speed is then equal to the forming speed. Because the chip spreading machine 1 is stationary the means which supply chips to the system are simplified considerably. The disadvantages associated with the system of FIG. 2 are that the saw 8 must be removable in itself, at least through a small distance and at low speed, and that the particle web 10 must be sawn with a double cut and the portion of the particle web situated between the cuts removed by suction and return to the chip production chain, and that the forward movement of the frame 18 must be stopped with great precision so that the transfer belt 3 reaches the correct position within close tolerances in relation to the press belt 5 and the drives of the belts can be connected together when the press is charged. The system of FIG. 1 does not require any great precision in the travel of the chip spreading machine 1.

FIG. 3 shows a system similar to that of FIG. 2, having a stationarily arranged chip spreading machine 1. However, in this embodiment the spreader belt 2 and the transfer belt 3 are also stationary in the system. Conversely, the transfer position between said belts, i.e. the opposing ends of said two conveyor belts and the slide plate 6 positioned therebetween are movably arranged in the longitudinal direction of the conveyor belts, i.e. of the system, while at the same time the upper portion of one belt is extended and the upper portion of the other belt is shortened by a corresponding amount. Such an arrangement is known per se in conveyor belts used within the food production and processing industry. The actual belt of the conveyor belt 2 and the transfer belt 3 are drawn in two loops at the opposing ends of the belts over an end roller 19 and 20 respectively and upper direction changing roller 21 and 22 respectively and a lower direction changing roller 23 and 24, respectively. The two end rollers 19, 20 and the two directional changing rollers 21, 22 and the slide plate 6 positioned between the end rollers are mutually stationarily positioned on a carriage 25 capable of travelling in the longitudinal direction of the system and which can move between the positions 25' and 25" shown in the drawing by morse lines. On the other hand, the two lower direction changing rollers 23, 24 are positioned in the stationary frame of the conveyor belt, as are also the remaining drive and guide rollers. The two direction changing rollers 21, 23 and 22, 24 are, for each conveyor belt 2 and 3, respectively, so positioned vertically in relation to each other that the belt portions between the upper and the lower direction changing roller are parallel within practical limits with the upper portion of the belt, so that the tension of the belt is not changed during movement of the carriage 25. Movement of said carriage does not therefore affect the conveyor belts in any way other than to extend the upper portion of one and shorten the upper portion of the other at exactly the same speed as that at which the carriage 25 moves. FIG. 3 also shows a cross cut saw 8 positioned on the carriage 25 and which travels together with said carriage between the positions 8' and 8" shown by morse lines in the figure. The saw is adapted to separate a particle slab 9 from the continuously forwardly growing particle web 10 with a single cut at the end of the slide plate 6 facing the transfer belt 3 after a suitable length of the particle web 10 has been passed to the conveyor belt 3.

Finally, the figure shows a carrier belt 11 arranged over the slide plate 7, a roller path 12 and a heat insulating passage 13, which has already been described with reference to FIG. 1, surrounding the lower part of press belt 5 and rollers 14. Drive and control means of known species are provided to produce and control the movement of the different conveyor belts 2, 3, 5 and 11 and the carriage 25 and saw 8; said drive and control means not being shown in the figure for the sake of clarity.

FIG. 3 shows in full lines the system at that moment when the press 4 has just been opened and is about to be charged. The last, pressed particle board 15 remains in the press opening resting on the press belt 5, which is still stationary in the position it occupied during the pressing operation. A pressed particle board 16 from a preceding pressing operation may still remain in the press, partially on the discharged end of the press belt 5 and partly on the roller path 12, unless some particular measures have been taken to remove it for further processing. The transfer belt 3 also remains stationary with a particle slab 9 already separated from the particle web 10 resting on the belt in the correct position for charging the press. The particle web 10 is formed on the spreader belt 2, the upper portion of which constantly moves beneath the chip spreading machine 1 at the forming speed. The leading end of the particle web 10 is thus constantly moved forwards, in a direction towards the press at the forming speed, which is suitably set so that a length of particle web equal to the desired length of the particle slab 9 is formed during the average time taken to effect a normal press cycle. The carriage 25 also moves in a direction towards the press 4 and the drive mechanism of said carriage is connected in a suitable way with the drive of the spreader belt 2, so that its speed is exactly the same as the forming speed. The slide plate 6 and the rollers 19 and 21 of the spreader belt 2 and rollers 20 and 22 of the transfer belts 3 accompany the movement of the carriage 25, and the particle web 10 therefore constantly adopts the same unchanged position on the slide plate 6 and the upper portion of the spreader belts 2, said upper portion being stationary in relation to the slide plate 6 and the carriage 25, while space is prepared for the longitudinal growth of the particle web 10 by virtue of the fact that the upper portion of the spreader belt 2 moves relative to the chip spreading machine 1 at the web forming speed.

As soon as the press 4 has been opened sufficiently—it need not be fully open—the press belt 5 is started and the pressed particle slab 15 is removed from the press opening. Simultaneously or immediately afterwards the transfer belt 3 is started together with the carrier belt 11 and driven at the same belt speed as the press belt 5, whereupon the particle slab 9 is passed onto the press belt 5 and carried by said belt into the now fully opened press 4 until it reaches the position 9′ whereafter the press is closed and pressing commenced. The pressed particle board 15 has now been moved to position 16 and can be removed on the roller path 12.

During the press charging operation the three conveyor belts 3, 5 and 11 are operated at the maximum speed which the loosely packed particle slab 9 can withstand without being damaged by occurring acceleration forces and air streams, to shorten the press charging time as much as possible. The drive of the transfer belt 3 and the carrier belt 11 are disconnected from the drive of the press belt 5 when the latter belt is stopped. They can then be operated independent of the press belt. Furthermore, the drive of the transfer belt 3 can be arranged so that the belt can be operated independent of the press belt 5 as soon as the rear end of the particle slab 9 has left the transfer belt 3, i.e. before the press has been fully charged.

Subsequent to disconnecting the transfer belt drive from the press belt drive, the press belt is connected instead to the drive of the spreader belt 2, so that the two conveyor belts 2 and 3 are then driven at the same belt speed, the web forming speed. The travel of the carriage 25 is then disconnected from the drive of the spreader belt 2 and the direction of travel of the carriage reversed, so that said carriage begins to move backwards, away from the press, whilst forming of the particle web 10 on the spreader belt 2 continues. The leading portion of the particle web 10 is passed from the spreader belt 2 to the transfer belt 3 at a speed which is the sum of the rearward travel speed of the carriage 25 and the forming speed. The rearward travel speed of the carriage 25 can be selected at high limits since it does not cause the particle web 10 to move.

When the carriage 25 has reached the rear position 25′ during the rearward movement of said carriage the movement is stopped and said carriage also stops in this position. Forming of the particle web 10 continues and the leading portion of the said web continues to pass over onto the conveyor belt 3 at the forming speed, until the portion of said web passed to the conveyor belt 3 has acquired a length suitable to form a new particle slab 9. The carriage 25 then moves forward and its drive is connected with the drive of the spreader belt 2, so that the speed of travel is equal to the forming speed. The saw 8 is then started, and a new particle slab 9 separated from the particle web 10.

Upon completion of the sawing operation the drive of the transfer belt 3 is disconnected from the drive of the spreader belt 2, whereafter the spreader belt 3 is driven at a suitable belt speed, which is greater than the forming speed but which is at most equal to the speed of the belt during the pressed charging operation to prevent the particle slab 9 carried by the transfer belt from being damaged. The particle slab 9 is thus moved forwards towards the press. When it has reached the shown position which it is to adopt at the commencement of a press charging operation, the conveyor belt 3 is stopped and remains stationary with the slab 9 positioned correctly in readiness for the next charging of the press. Whilst these events are taking place, forming of the particle web on the spreader belt 2 continues, at the same time as the carriage 25 moves towards the press at the forming speed, so that the leading end of the particle web which lies on the slide plate 6 is also moved towards the press 4. At the beginning of the next press charging operation the various components of the system are thus back in the starting position, shown by full lines in the figure. The carriage 25 together with the opposing ends of the conveyor belt 2 and 3 and the slide plate 6 and the leading end of the particle web 10 resting thereon can, however, have adopted a different position, depending upon the length of time taken to effect the press cycle, i.e. the length of time the particle slab 9 has waited in readiness in the shown position.

In normal cases this waiting period is short. Only a short length of new particle web 10 is formed and the frame 25 is moved only through a short distance from the rear end position 25′ during the sawing operation and the forward movement of the particle slab 9 to the correct position for charging during the waiting time. The carriage 25 and the conveyor belts 2 and 3, however, are suitably constructed for a considerably longer travel of the carriage than that normally required, so that if necessary a considerably longer waiting period than normal can be tolerated.

The leading end of the forwardly growing particle web 10, however, is never able to overtake the rear end of the waiting particle slab 9. Forming of the particle web is stopped automatically by a signal from a suitable transmitter when the carriage 25 has reached a forward position 25″, immediately before the leading end of the particle web 10 resting on the slide plate 6 has reached the rear edge of the particle slab 9.

It will be evident from the aforegoing description of the functioning of the system that the cross cut saw 8, which is a relatively heavy unit, need not accompany the carriage 25 through the whole of its movement, but only for the first portion of the slow forward movement thereof, until completion of the sawing operation. It may therefore be convenient to movably arrange the saw on a separate path. The saw 8 is connected together with the carriage 25 when both units are in their rear positions 8′ and 25′ respectively, and is disconnected from the carriage as soon as sawing has been completed. It then returns at a low speed, e.g. the web forming speed, to the starting position 8′, where it is reconnected with the carriage 25 when this has returned and stopped at position 25′.

It is also desirable in the embodiment shown in FIG. 3 to be able to free the transfer belt 3 from the portion of the particle web 10 passed thereon or from the finished particle slab 9 by a manual signal when a fault is observed in the slab or web, or to reset the synchronization of the system between web forming and pressing operations, subsequent to an abnormally long waiting period, and by an automatic signal to obviate the necessity of interrupting the web forming sequence at an otherwise accessively long waiting period before the press is ready for charging, as described in the aforegoing. However, as described in the aforegoing it is difficult for several reasons to lower one end of the transfer belt 3 so that the goods thereon can be emptied over the lower end of said belt. FIG. 4 therefore shows an alternative arrangement for emptying the transfer belt 3 of goods positioned thereon.

In FIG. 4 the transfer belt 3 is arranged at the front end thereof in a manner similar to the rear end. The actual belt is drawn over three rollers, an end roller 26, an upper direction changing roller 27 and a lower direction changing roller 28. The end roller 26 and the upper direction changing roller 27 are mutually stationarily positioned on a second carriage 29 capable of travelling in the longitudinal direction of the belt and which is normally positioned in the position shown by full lines with the end roller 26 contiguous to the slide plate 7, but which can be moved to the position 29' shown in morse lines, to form an opening between the end roller 26 and the slide plate 7 through which the goods present on the transfer belt 3 can be discarded down into a bin 17 placed beneath the opening, from which bin the goods can then be returned to a suitable station in the chip producing chain.

When an emptying signal is transmitted while the first carriage 25 occupies its rearward position 25' the two carriages 25 and 29 begin to move. The carriage 25 moves in a normal manner at the web forming speed and the carriage 29 moves rapidly to position 29' and remains there. The portion of the particle web 10 located on the transfer belt 3 is divided in the normal manner by the saw 8 and the speed of the transfer belt 3 is then increased, also normally, although the rapid movement is not interrupted before the goods present on the transfer belt 3 have been emptied into the bin 17. The carriage 29 then returns to the normal position, shown in full lines, at the same time as the transfer belt 3 and the carriage 25 starts to operate in the same manner as that subsequent to a normal press charging operation. The emptying signal is blocked during the commencement of a press charging operation until the carriage 25 has reached its rearward position 25', although said signal can in other respects be released at any time whatsoever; those part sequences of the emptying manoeuver already effected, however, being omitted. In other respects the differences between the different systems shown in the figures are not great, and all said systems afford the same advantages as compared with known systems. The press belt 5 can naturally be arranged similarly in all embodiments, independent as to whether the system in general is provided with a travelling or stationarily chip spreading machine 1. A preliminary condition is that the extent of travel of the chip spreading machine 1 is approximately the same as the extent of travel of frame 18, for instance if it is desired in all instances to have at disposal the same time reserve for an abnormally long pressing cycle without necessitating interruption of the web forming sequence. The normal travel movement of the movable chip spreading machine of FIG. 1 is essentially shorter than the movement of the movable frame 18 of FIG. 2, which always travels the same maximum distance, although those systems require approximately the same space.

It should be understood that the invention is not restricted to the shown and described embodiments, but that it can be varied within the scope of the following claims. For instance, it can be employed in the manufacture of particle board according to the dry method. The design and construction of the components forming part of the systems may also deviate from that shown and described. For instance, it may not be necessary when emptying the transfer belt 3 to tip the whole of the belt, which may be 10 to 15 metres long, around its forwards roller, as indicated in FIGS. 1 and 2, since in these embodiments it may suffice to tilt only the rear portion of the belt. The chip bin 17 may also be placed at the front end of the conveyor belt 3 and the belt emptied whilst being driven forwards, even though spacewise the arrangement shown in the drawing is more suitable. In the system shown in FIG. 2 the slide plate 7 and the carrier belt 11 may also be mounted on the frame 18 and accompany its travel if, for some reason, this should be deemed suitable.

In a system in which the chip spreading machine 1 is stationary it need not be necessary to arrange two conveyor belts 2 and 3 on a common movable frame 18, but that the necessary movement of the frame and belts can be caused in some other way and by some other means than those described and shown in the drawing.

What is claimed is:

1. A system for manufacturing particle board and the like comprising a continuously operating chip spreading machine (1), an endless conveyor belt (2) constituting a spreader belt, arranged beneath said machine (1) and on which the goods to be pressed are placed by the chip spreading machine (1) in the form of a continuously forwardly extending integrated web (10), a second endless conveyor belt (3) constituting a transfer belt to which the goods (9, 10) are transferred from said spreader belt (2), a cross cut saw (8) which divides the forward portion of the web (10) into slabs (9) of suitable length, and a stationary single storey press (4) which is provided with a third endless conveyor belt (5) constituting a press belt which is drawn through the press opening and to which the slab (9) is transferred from the transfer belt (3) when charging the press (4) and by means of which said slab is moved into the press opening the three endless conveyor belts (2, 3, 5) and plates (6, 7) positioned therebetween being arranged with their upper surfaces supporting the web (10) and the slab (9) in essentially the same substantially horizontal plane, the transfer position between said spreader belt (2) and said transfer belt (3) being movably arranged in relation to the chip spreading machine (1) in the longitudinal direction of the system in such a way that the distance between the chip spreading machine (1) and the transfer position is extended and decreased during each press cycle, one of the end rollers of each of the spreader belt (2) and the transfer belt (3) being fixed in relation to each other at the transfer position, and a fourth endless conveyor belt (11) constituting a carrier belt, is arranged above said plate (7) between said transfer belt (3) and said press belt (5) and when charging the press (4) is operated at the same speed as said transfer belt (3) and said press belt (5) and both the chip spreading machine (1) and the spreader belt (2) and the transfer belt (3) being stationarily arranged, while the transfer position between said two conveyor belts (2, 3), i.e. the opposing ends of the conveyor belts (2, 3) and the slide plate (6) positioned therebetween, are arranged for movement in the longitudinal direction of the system during simultaneous extension of the upper portion of one belt and an equally large shortening of the upper portion of the second belt, the spreader belt (2) and the transfer belt (3) being drawn at the ends thereof facing each other in two loops over an end roller (19, 20), an upper direction changing roller (21, 22) which is placed closer to the respective other end of the conveyor belts than the end roller, and a lower direction changing roller (23, 24) which is positioned farther away from the other end of respective conveyor belts than the upper direction changing roller, the direction changing rollers (21, 23 and 22, 24) being arranged so that the portion of the belt therebetween is parallel with its upper portion and the two end rollers (19, 20) and the two upper direction changing rollers (21, 22) and the slide plate (6) positioned between the upper end rollers are mutually fixedly arranged on a carriage (25) capable of moving in the longitudinal direction of the system.

2. A system for manufacturing particle board and the like, comprising a continuously operating chip spreading machine (1), an endless conveyor belt (2) constituting a spreader belt, arranged beneath said machine (1) and on which the goods to be pressed are placed by the chip spreading machine (1) in the form of a continuously forwardly extending integrated web (10), a second endless conveyor belt (3) constituting a transfer belt to which the goods (9, 10) are transferred from said spreader belt (2), a cross cut saw (8) which divides the forward portion of the web (10) into slabs (9) of suitable length, and a stationary single storey press (4) which is provided with a third endless conveyor belt (5) constituting a press belt which is drawn through the press opening and to which the slab (9) is transferred from the transfer belt (3) when charging the press (4) and by means of which said slab is moved into the press opening the three endless conveyor belts (2, 3, 5) and plates (6, 7) positioned therebetween being arranged with their upper surfaces supporting the web (10) and the slab (9) in essentially the same substantially horizontal plane, the transfer position between said spreader belt (2) and said transfer belt (3) being movably arranged in relation to the chip spreading machine (1) in the longitudinal direction of the system in such a way that the distance between the chip spreading machine (1) and the transfer position is extended and decreased during each press cycle, one of the end rollers of each of the spreader belt (2) and the transfer belt (3) being fixedly in relation to each other at the transfer position, and a fourth endless conveyor belt (11) constituting a carrier belt, is arranged above said plate (7) between said transfer belt (3) and said press belt (5) and when charging the press (4) is operated at the same belt speed as said transfer belt (3) and said press belt (5) and presses against the top surface of the slab (9), at least while the rear portion of said slab is moving over said plate (7), both the chip spreading machine (1) and the spreader belt (2) and the transfer belt (3) being stationarily arranged, while the transfer position between said two conveyor belts (2, 3), i.e. the opposing ends of the conveyor belts (2, 3) and the slide plate (6) positioned therebetween, are arranged for movement in the longitudinal direction of the system during simultaneous extension of the upper portion of one belt and an equally large shortening of the upper portion of the second belt, the transfer belt (3) being drawn at the end thereof facing the press belt (5) over an end roller (26), an upper direction changing roller (27) and a lower direction changing roller (28) in a manner similar to its other end, the end roller (26) and the upper direction changing roller (27) being mutually fixedly arranged on a carriage (29) capable of moving in the longitudinal direction of the system, so that the belt portion of the conveyor belt (3) can be freed from material placed thereon by moving the carriage (29) rearwardly through an appropriate distance in a direction away from the press (4) while the belt is stationary, the belt being then started and operated so that the material is emptied down through the opening between the transfer belt (3) and the slide plate (7) which appears upon movement of the carriage (29).

References Cited
UNITED STATES PATENTS

| | | | |
|---|---|---|---|
| 3,076,236 | 2/1963 | Labino | 156—369 X |
| 3,332,819 | 7/1967 | Siempelkamp | 156—375 |
| 3,428,505 | 2/1969 | Siempelkamp | 156—373 X |

BENJAMIN A. BORCHELT, Primary Examiner

J. J. DEVITT, Assistant Examiner

U.S. Cl. X.R.

156—369